United States Patent [19]
Brown

[11] Patent Number: 5,205,570
[45] Date of Patent: Apr. 27, 1993

[54] DOG SLED CONSTRUCTION

[76] Inventor: Carl W. Brown, P.O. Box 370, Intervale, N.H. 03845

[21] Appl. No.: 790,823

[22] Filed: Nov. 12, 1991

[51] Int. Cl.$^5$ ............................................. B62C 1/04
[52] U.S. Cl. ..................................... 280/24; 280/14.2
[58] Field of Search ............... 280/24, 845, 12.1, 14.2, 280/18, 19, 21.1, 24, 19.1, 16, 15

[56] References Cited
U.S. PATENT DOCUMENTS
1,606,425 11/1926 Johanson .......................... 280/14.2

OTHER PUBLICATIONS

The Dearborn Independent, Aug. 12, 1922, Baldy of Nome Article, p. 11.

Primary Examiner—Richard M. Camby
Attorney, Agent, or Firm—Leon Gilden

[57] ABSTRACT

A platform member formed of a plurality of elongate slats in contiguous communication relative to one another includes a forward, rear, and medial support bar that are mounted to a respective forward brush bow, forward right and left support legs, and a handle construction respectively. The organization includes a plurality of junctions, each junction including a discrete and unique connector structure to effect ease of assembly and securement of the components of the organization in an integral assemblage.

5 Claims, 7 Drawing Sheets

DOG SLED CONSTRUCTION

BACKGROUND OF THE INVENTION

1. Field of the Invention

The field of invention relates to sled construction, and more particularly pertains to a new and improved dog sled construction wherein the same is arranged to utilize polymeric fittings utilizing non-corrosive fasteners and the like to provide for assemblage of the organization together.

2. Description of the Prior Art

Dog sleds of the prior art have typically utilized rawhide or nylon lacing and the like subjecting connections to failure due to typical stress in construction of dog sled apparatus in the prior art. U.S. Pat. No. 3,522,952 to Uttenthaler sets forth a unitary sled construction as assembled in the prior art.

U.S. Pat. No. 3,711,879 to Siefert sets forth a rescue sled formed of various pontoon construction to permit flotation of the organization over a body of water.

U.S. Pat. No. 4,861,052 to Acdiger sets forth a sled dog training cart utilizing a four-wheeled cart for the training or sled dogs.

As such, it may be appreciated that there continues to be a need for a new and improved dog sled construction as set forth by instant invention which addresses both the problems of ease of use as well as effectiveness in construction in providing for an organization to include non-corrosive joint construction formed various component junctions of the dog sled providing for a unique and integral construction of the dog sled resistant to stress and destruction of the joints in use.

SUMMARY OF THE INVENTION

In view of the foregoing disadvantages inherent in the known types of sled construction now present in the prior art, the present invention provides a dog sled construction wherein the same utilizes non-corrosive joints in securing of the dog sled components together. As such, the general purpose of the present invention, which will be described subsequently in greater detail, is to provide a new and improved dog sled construction which has all the advantages of the prior art sled constructions and none of the disadvantages.

To attain this, the present invention provides a platform member formed of a plurality of elongate slats in contiguous communication relative to one another including a forward, rear, and a medial support bar that mounts to respective forward brush bow, forward right and left support legs, and a handle construction respectively. The organization includes a plurality of junctions, each junction including a discrete and unique connector structure to effect ease of assembly and securement of the components of the organization in an integral assemblage.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of this invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dog sled construction which has all the advantages of the prior art sled constructions and none of the disadvantages.

It is another object of the present invention to provide a new and improved dog sled construction which may be easily efficiently manufactured and marketed.

It is a further object of the present invention to provide a new and improved dog sled construction which is of a durable and reliable construction.

An even further object of the present invention is to provide a new and improved dog sled construction which is susceptible of a low cost of manufacture with regard to both materials and labor, and which accordingly is then susceptible of low prices of sale to the consuming public, thereby making such dog sled construction economically available to the buying public.

Still yet another object of the present invention is to provide a new and improved dog sled construction which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Figure 7:
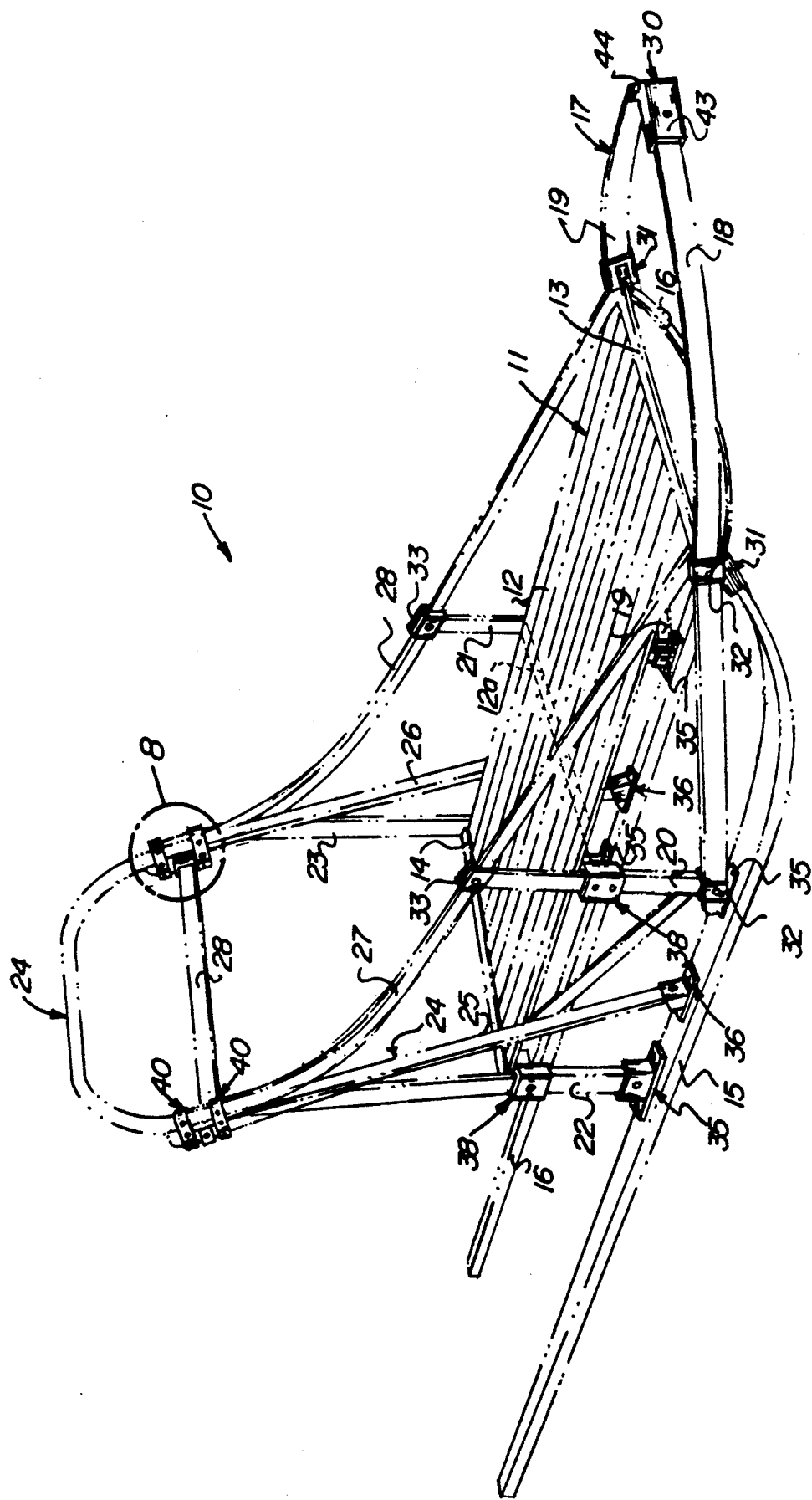
FIG. 7 is an isometric illustration of the dog sled in assembled configuration.

FIG. is an isometric illustration of the connection as set forth in section 8 of FIG. 7.

Figure 9:
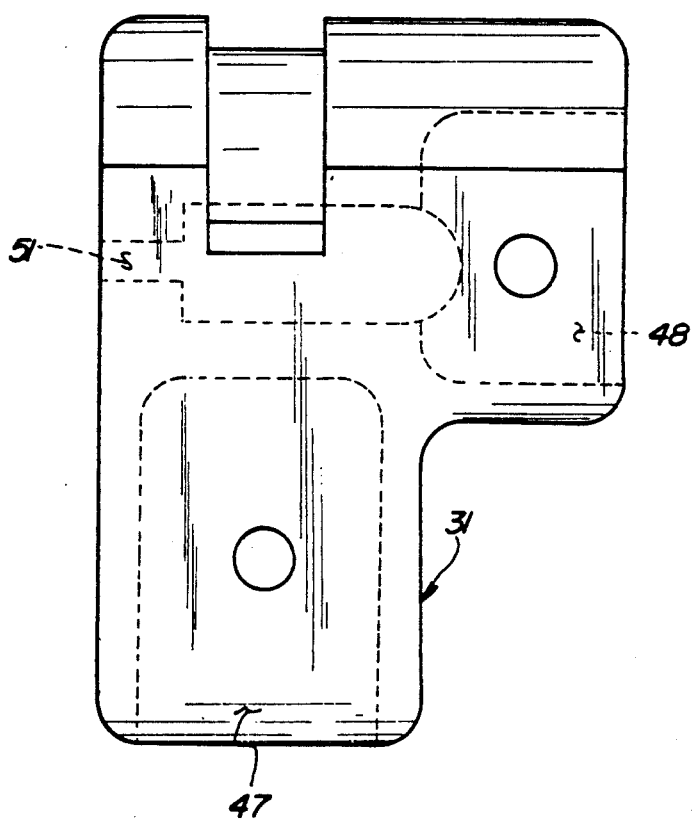

FIG. 9 is an orthographic side view of an "L" shaped support bar interconnector utilized by the invention.

Figure 10:
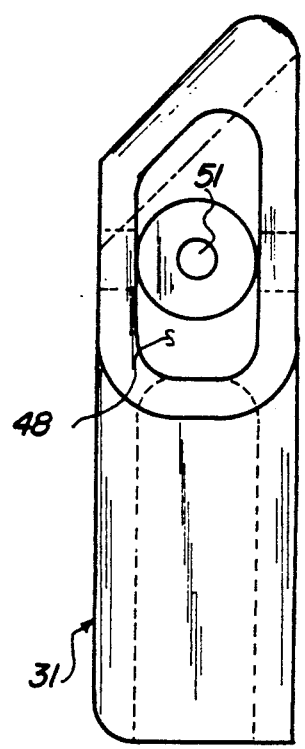

FIG. 10 is an orthographic end view of the connector as set forth in FIG. 9.

Figure 11:
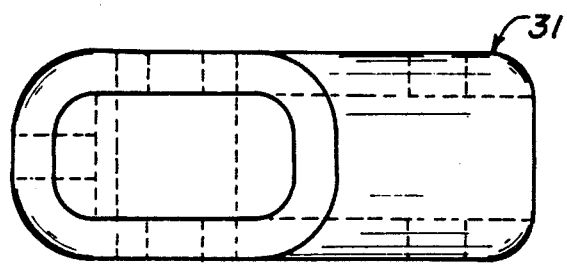

FIG. 11 is an orthographic top view of the connector as set forth in FIG. 9.

Figure 12:
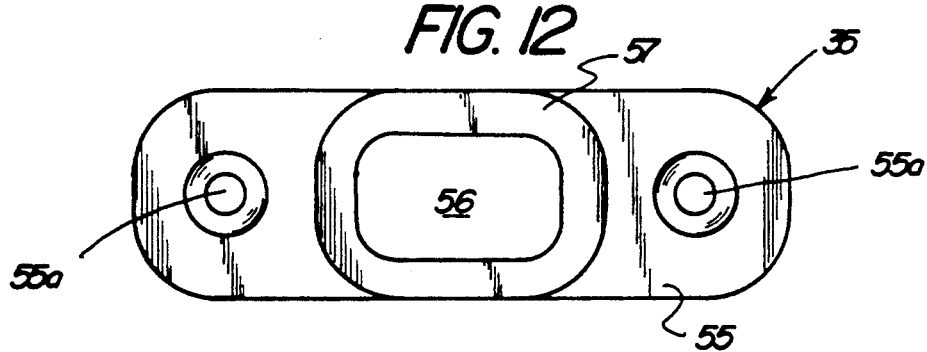

FIG. 12 is an orthographic top view of a support bar lower connector utilized by the invention.

Figure 13:
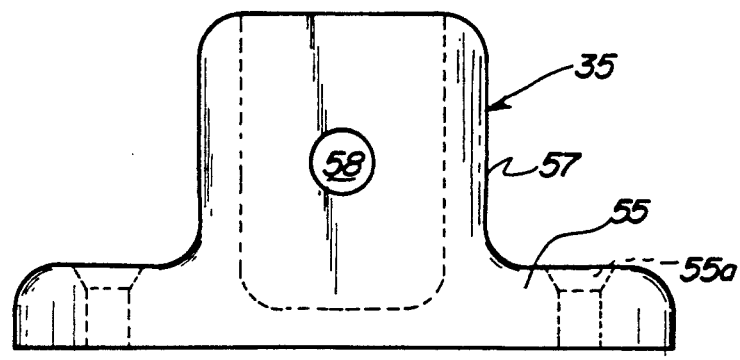

FIG. 13 is an orthographic side view of the connector as set forth in FIG. 12.

Figure 14:
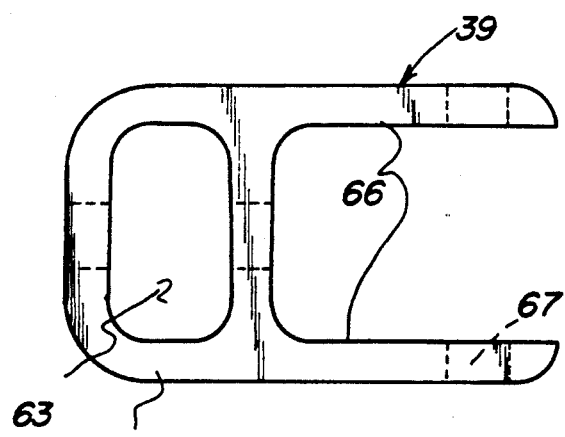

FIG. 14 is an orthographic top view of a loop connector utilized by the invention.

Figure 15:
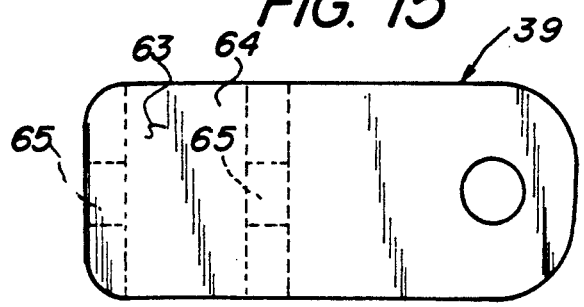

FIG. 15 is an orthographic side view of the connector as set forth in FIG. 14.

Figure 16:
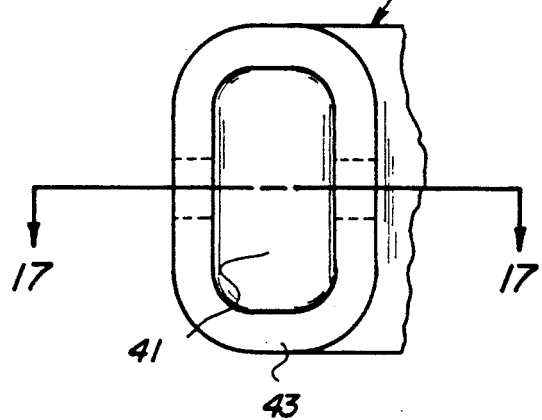

FIG. 16 is an orthographic sectional end view of the bow connector utilized by the invention.

Figure 17:
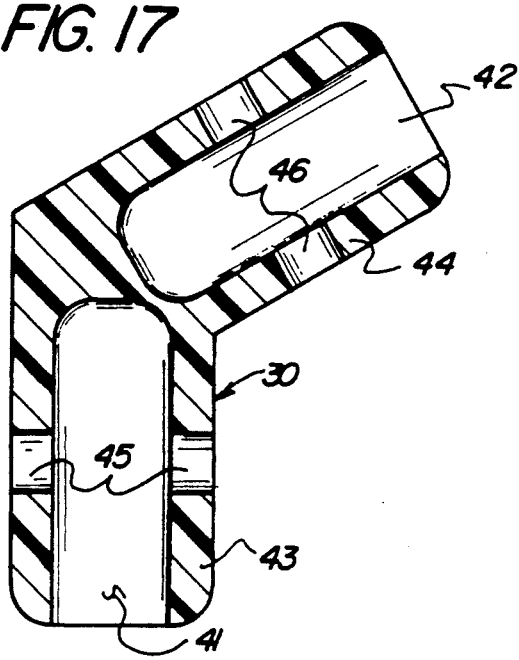

FIG. 17 is an orthographic view, taken along the lines 17—17 of FIG. 16 in the direction indicated by the arrows.

Figure 18:
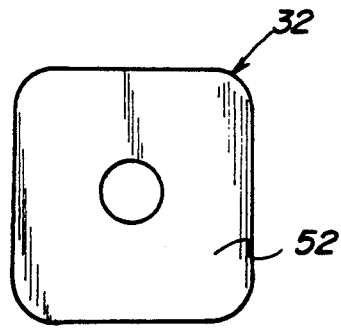

FIG. 18 is an orthographic side view of a support bar outer connector utilized by the invention.

Figure 19:
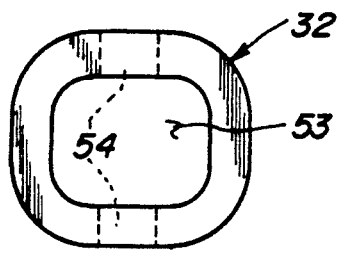

FIG. 19 is an orthographic top view of the connector as set forth in FIG. 18.

DESCRIPTION OF THE PREFERRED EMBODIMENT

With reference now to the drawings, and in particular to FIGS. 1 to 19 thereof, a new and improved dog sled construction embodying the principles and concepts of the present invention and generally designated by the reference numeral 10 will be described.

More specifically, the dog sled construction 10 of the instant invention essentially includes a platform member 11 (see FIG. 7) formed of a plurality of contiguous, parallel, and coextensive slats 12 defining a generally flat platforms, as illustrated, to include a forward support bar 13, a rear support bar 14 orthogonally secured to the forward and rear distal ends of the platform in an orthogonal relationship, with a medial slat 12a arranged parallel of and between the forward and rear slots 13 and 14. A "J" shaped right skid 15 is spaced from and parallel a left "J" shaped skid 16 positioned below and on opposed sides of the platform 11, wherein a forward distal end of each right and left skid 15 and 16 is arranged for securement to opposed right and left distal ends of the forward support bar 13 to define a second junction formed by the cooperation of an "L" shaped support bar interconnector 31 and a support bar outer connector 32 that are mounted together. A brush bow 17 is formed with a left and right support leg 21 and 22 originating from the respective left and right skids 16 and 15 and joined together at a first junction secured by a "V" shaped bow connector 30. A forward right and left support leg 20 and 21 orthogonally positioned relative to the platform 11 and mounted on opposed sides of the platform 11 are joined to the right and left skids 15 and 16 at a third junction to include a forward support bar lower connector 35 and a support bar outer connector 32. A forward support bar upper connector 33 defines an upper junction joining the upper terminal ends of the right and left forward support legs 20 and 21 respective right and left side bars 27 and 28.

A fifth junction is formed by the connection of the respective right and left distal ends of the rear support bar 14 to rear right and left support legs 22 and 23. A seventh junction includes the lower distal ends of the rear right and left support legs 22 and 23 mounted to respective right and left skids 15 and 16 utilizing a lower connector 35 as illustrated. A "U" shaped handle 24 includes respective right and left handle legs 25 and 26 that extend downwardly and are mounted to upper terminal ends of the rear right and left support legs 22 and 23, and define an eight junction to include a handle leg lower connector 36 joining the respective right and left handle legs 25 and 26 to the skids 15 and 16 respectively.

A ninth junction (see FIG. 8) utilizes a plurality of junction loop connectors 40, to include a ninth junction connector 32a receiving a rear support bar junction connector 39 that is secured to the distal ends of the handle reinforcement leg 29, as illustrated.

It may be appreciated that fasteners utilized in the securement of the various connectors are typically formed of a stainless steel or other suitable rigid material resistant to corrosion and typically the connectors are formed of a polymeric material such as nylon and the like to provide for rigidity and resistance to corrosion in use.

The "V" shaped bow connector 30, as illustrated in FIGS. 16 and 17, includes a bow connector first socket 41 formed within a first tube 43, wherein the first tube 43 is integrally and acutely intersecting a second tube 44 that is formed with a second socket 42 to receive the forward distal ends of the right and left respective bow legs 18 and 19. First fasteners are directed through first lock pin bores 45 orthogonally directed through the first socket 41, with a second lock pin bores 46 receiving second fasteners therethrough in securing of the respective right and left bow legs 18 and 19.

The "L" shaped support bar interconnector 31, such as illustrated in FIGS. 9–11, includes a support bar interconnector first socket 47 orthogonally oriented relative to a support interconnector second socket 48 to receive the respective right and left distal ends of the forward support bar 13 at upper terminal ends of the right and left skids 15 and 16 within the first sockets 47 as the second socket 48 receives the distal ends of the forward support bar 13 mounted to the right and left distal ends thereof, as illustrated in FIG. 7. First and second sockets 47 and 48 are formed within orthogonally oriented first and second tubes 49 and 50 respectively. First and second tube bores orthogonally directed through the tubes and the associated sockets receive associated fasteners therethrough. A support bar interconnector fastener rod bore 51 that is directed to coaxially intersect the second socket 48 is arranged to receive a third fastener that is directed through the support bar outer connector 32 of a type as illustrated in the FIG. 18 for example, that includes an associated outer connector tube 52 forming an outer connector bore 53 that is arranged to receive a respective bow leg therethrough and is formed with a through-extending fastener bore 54 to receive the third fastener therethrough and into the support bar interconnector fastener rod bore 51. Fourth fasteners, as discussed, are directed into the first and second sockets 47 and 48 bores to secure the right and left skids 15 and 16, as well as the forward support bar 13 respectively relative to the first and second sockets. The forward support bar lower fastener 35 that is secured to a lower terminal end of the right and left forward support legs 20 and 21, as well as to the lower terminal ends of the rear right and left support legs 22 and 23 is formed with a lower connector mounting plate 55 arranged for securement to an associated skid 15 or 16 formed with mounting plate bores 55a, and including a lower connector mounting tube 57 forming a receiving socket 56 orthogonally oriented relative to the mounting plate 55, wherein each socket 56 receives a lower terminal end of an associated support leg, as illustrated. Lower connector tube fastener bores 58 orthogonally directed through the tube 57 receive a fifth fastener therethrough that is in turn directed through the various support leg in construction of the skid.

The eighth junction utilizing the handle leg lower connector 36 mounting the lower terminal ends of the respective right and left handle legs 25 and 26 of the "U" shaped handle 24 to the respective right and left "J" shaped skids 15 and 16 includes a handle leg connector mounting plate 59 for securement to the right and left skid, with a handle leg connector socket tube 61 defining a socket 60 that is oriented at an acute included angle between the mounting plate 59 and the associated handle leg connector socket tube 61. The socket tube bore 62 are arranged to receive six fasteners therethrough in securing the respective handle legs relative to the skids.

The rear support bar connectors 38 joining the rear and medial support bars 13 and 12 respectively relative to the platform are each formed with, as illustrated, a central tube and a forward tube orthogonally oriented relative to the central tube, wherein the forward tube is arranged for reception of the associated support bar therewithin in a mounting construction.

Figure 1:
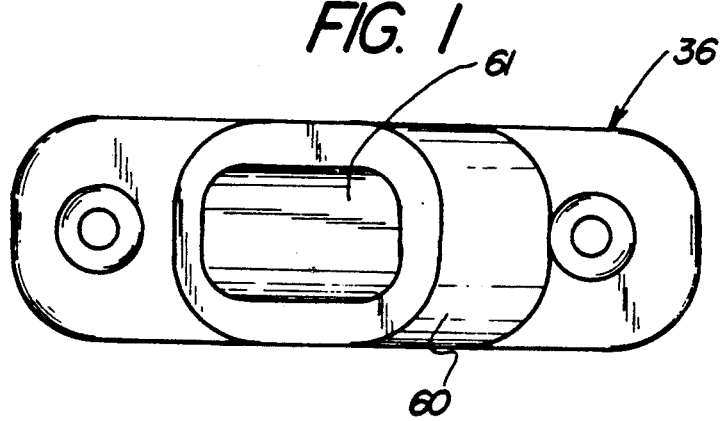
FIG. 1 is a top orthographic view of a handle leg lower connector utilized by the invention.
Figure 2:
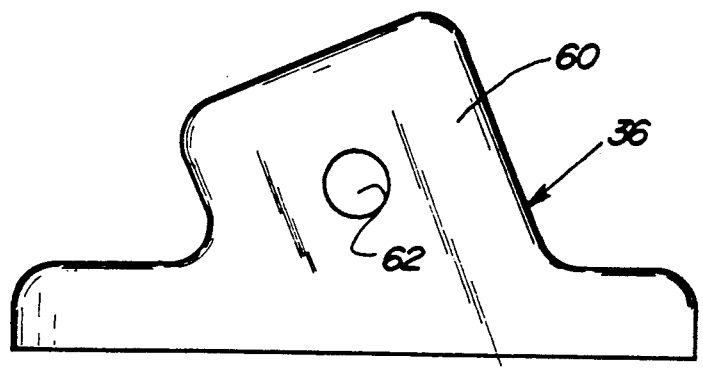
FIG. 2 is an orthographic side view of the connector as illustrated in FIG. 1.
Figure 3:
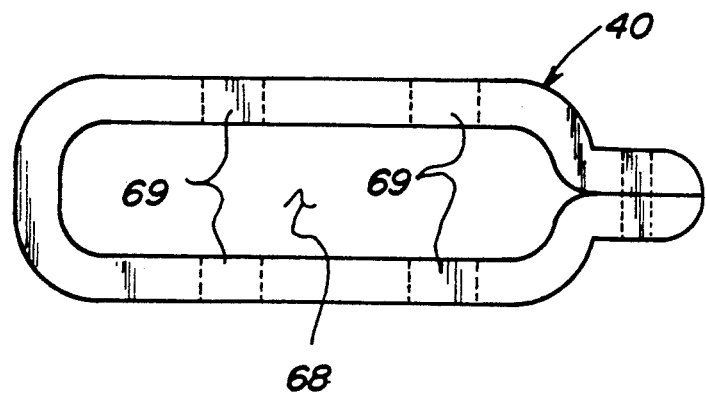
FIG. 3 is an orthographic top view of a loop connector utilized by the invention.
Figure 4:
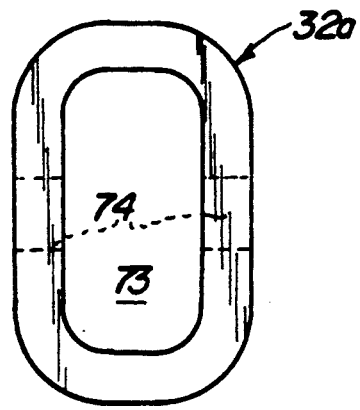
FIG. 4 is a orthographic top view of a knife conjunction connector utilized by the invention.
Figure 5:
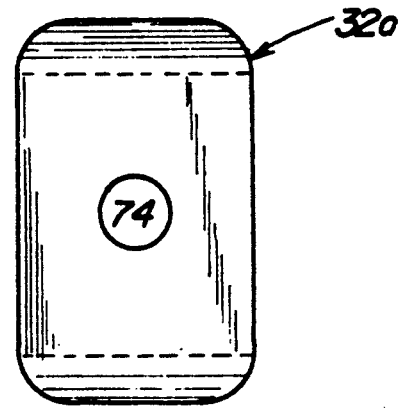
FIG. 5 is an orthographic side view of the connector as set forth in FIG. 4.
Figure 6:
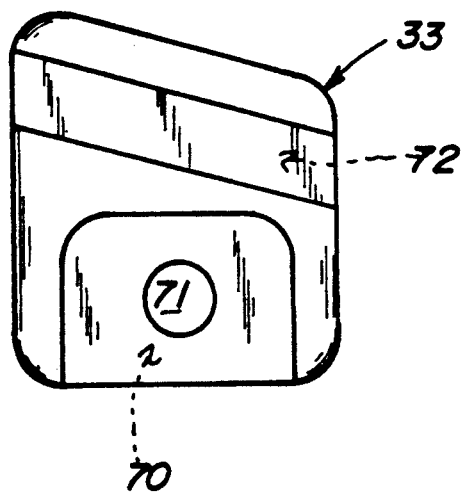
FIG. 6 is a orthographic side view of a forward support bar upper connector utilized by the invention.
Figure 8:
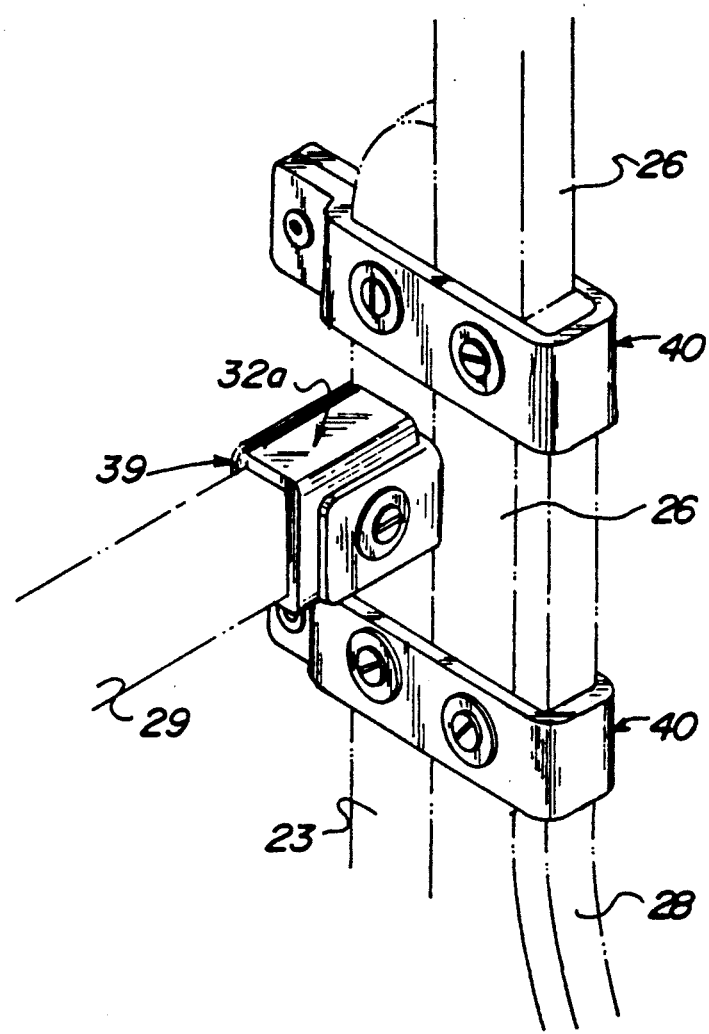

The ninth junction formed at upper distal ends of the right and left side bars 27 and 28, upper distal ends of the rear right and left support legs 22 and 23, right and left respective distal ends of the handle reinforcement leg 29, as well as securing the right and left legs of the "U" shaped handle at that junction, are arranged to include a plurality of junction loop connectors 40, such of a type as illustrated in FIG. 3, to include loop connector socket bores 69 orthogonally directed through a loop connector socket 68 to receive the right and left handle legs 25 and 26, the FIG. 8 illustrates the left handle leg, where it is understood that the right handle leg, as well as the right portions of the sled, are merely a mirror image thereof, as well as to receive the upper terminal ends of the left side bar 28 and the upper terminal end of the rear left support leg 23. The handle reinforcement leg 29 in turn receives a ninth junction connector 32a, such as illustrated in FIGS 4 and 5, that is substantially identical to the support bar outer connector 32, wherein the ninth junction connector 32a is formed to include a socket 73 formed with bores 74 that in turn receive the associated fastener therethrough that is directed through the projecting legs of the parallel legs 66 (see FIG. 14 for example). A junction connector socket 63 is arranged to receive an associated upper terminal end portion of a rear support leg 23 therethrough defined within a junction connector tube 64. The parallel leg bores 67 receive a fastener therethrough, as well as through the ninth junction connector 32a, as illustrated in FIG. 8 for example.

The forward support bar upper connector 33 is defined with a forward support connector receiving socket 70 to receive an upper terminal end of an associated forward support leg, and includes a body that is formed with a forward support connector side bar bore 72 to receive a side bore therethrough that is formed at an acute angle between the side bar bore 72 and the associated socket 70. The receiving socket bores 71 are arranged to receive fasteners therethrough in the mounting of the side bar relative to the support leg.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A dog sled construction, comprising in combination,
    a platform member, the platform member including a forward support bar fixedly mounted to a forward distal end of the platform member orthogonally oriented relative to the platform member, a medical support bar orthogonally and integrally mounted medially of the platform member, and a rear support bar mounted to a rear distal end of the platform member, wherein the rear support bar, the forward support bar, and the medial support bar are arranged in a parallel relationship, and
    a right "J" shaped skid positioned below the platform member and extending forwardly of the platform member secured to a right distal end of the forward support bar, and a left "J" shaped skid oriented parallel to the right "J" shaped skid positioned below the platform member and extending forwardly to the forward support bar fixedly mounted to a left distal end of the forward support bar, and
    a forward right support leg fixedly mounted to a right distal end of the medial support bar and extending below the medial support bar fixedly mounted to the right skid, and
    a forward left support leg oriented parallel to the forward right leg fixedly and orthogonally mounted to the medial support bar extending below the medial support bar and fixedly secured to the left "J" shaped skid, and
    a rear right support leg mounted to a right distal end of the rear support bar extending below the rear support bar fixedly mounted to the right skid, and
    a rear left support leg fixedly mounted to a left distal end of the rear support bar extending below the rear support bar and orthogonally oriented thereto, wherein a lower distal end of the rear left support leg is fixedly mounted to the left skid, wherein the rear right support leg is positioned rearwardly of the forward right support leg and the rear left support leg is positioned rearwardly of the forward left support leg, and a "U" shaped handle including a right handle leg and a left handle leg arranged parallel relative to one other, wherein the right handle leg is secured to an upper distal end of the rear right support leg extending downwardly below the support position and fixedly secured to the right skid between the rear right support leg and the forward right support leg, and the left handle leg mounted to an upper distal end of the rear left support leg extending downward below the support platform and fixedly secured to the left skid between the rear left support leg and the forward left support leg, and a right side bar mounted adjacent the upper terminal end of the rear right support leg extending forwardly of the rear right support leg fixedly secured to an upper terminal end of the forward right support leg secured to the platform member, and a left side bar secured adjacent the rear left support leg extending forwardly thereof and mounted fixedly to an upper terminal end of the forward left support extending forwardly thereof secured to the support member, and a brush bow having a right bow leg and as left bow leg, the right bow leg fixedly secured to the lower terminal end of the forward right support leg an the forward terminal end of the right skid and fixedly secured to a forward terminal end of the left bow leg, wherein the left bow leg is mounted adjacent the lower terminal end of the forward left support leg and the left distal end of the forward support bar.

2. An apparatus as set forth in claim 1 wherein the right bow leg is secured to the left bow leg at a first joint connection, including a "V" shaped bow connector, wherein the "V" shaped bow connector includes a first socket receiving the forward terminal end of the right bow leg, and a second socket receiving the forward terminal end of the left bow leg, wherein the first socket and the second socket define an acute angle therebetween.

3. An apparatus as set forth in claim 2 wherein a a second joint connection including an "L" shaped support bar connector, wherein the support connector includes first support bar connector socket orthogonally oriented relative to the second support bar connector socket, wherein the first support bar connector socket is arranged for the reception of the right distal end of the forward support bar and the second support bar connector socket is arranged for the reception of the upper distal end of the right skid, and the second joint connection further includes a support bar outer connector pivotally mounted to the "L" shaped support bar connector, wherein the support bar outer connector is arranged for reception of the right bow leg and includes fastener directed through the support bar outer connector and received within the "L" shaped support bar inner connector orthogonally oriented relative to the support bar connector first socket, and a further second junction connection is formed at an intersection of the left distal end of the forward support bar, a forward distal end of the left skid, and the left bow leg, wherein a further "L" shaped support bar connector is secured to the left distal end of the forward support bar and the forward distal end of the left skid, and a further support bar outer connector is secured to the left bow leg and includes a further fastener directed through the support bar outer connector orthogonally directed into the "L" shaped support bar interconnector.

4. An apparatus as set forth in claim 3 including a third joint connection, including a support bar lower connector, wherein the support bar lower connector includes a connector mounting plate secured to a top surface of the right skid, and a connector socket orthogonally oriented relative to the mounting plate receiving the forward right support leg thereon, and a bow leg connector, including a tubular member formed with a tubular member pin orthogonally directed through the tubular member, wherein the tubular member receives a lower distal end of the right bow leg therethrough.

5. An apparatus as set forth in claim 4 including a handle reinforcement leg extending between the right handle leg and the left handle leg including a handle reinforcement leg first tubular connector mounted to a right distal end of the handle reinforcement, and the handle reinforcement leg left tubular connector mounted to a left distal end of the handle reinforcement leg, and a respective right and left junction connector socket mounted adjacent each upper terminal end of the respective right and left rear support legs, and each respective right and left junction connector socket including a respective pair of right and left parallel legs, wherein the right parallel legs receive the right tubular connector therebetween, and the left parallel legs receive the left tubular connector therebetween, and at least one right loop connector mounted for surrounding relationship relative to an upper terminal end of the right side bar, the right handle leg, and the upper terminal end of the right rear support leg, and at least one left loop connector arranged for surrounding relationship relative to the upper terminal end of the left side bar, the left handle leg, and the upper terminal end of the left rear support leg.

* * * * *